United States Patent
Ruff et al.

(10) Patent No.: US 7,094,461 B2
(45) Date of Patent: *Aug. 22, 2006

(54) P-POLARIZER WITH LARGE Z-AXIS REFRACTIVE INDEX DIFFERENCE

(75) Inventors: Andrew T. Ruff, Mendota Heights, MN (US); James M. Jonza, Woodbury, MN (US); Timothy J. Hebrink, Oakdale, MN (US); Laurence R. Gilbert, Marine on St. Croix, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 162 days.

This patent is subject to a terminal disclaimer.

(21) Appl. No.: 10/334,836

(22) Filed: Dec. 31, 2002

(65) Prior Publication Data

US 2004/0126549 A1    Jul. 1, 2004

(51) Int. Cl.
B32B 7/02       (2006.01)
B32B 27/36      (2006.01)

(52) U.S. Cl. .............. 428/212; 428/421; 428/480; 428/483; 359/483; 359/487

(58) Field of Classification Search ......... 428/212, 428/912.2, 480, 323, 577, 49, 421, 483; 359/483, 359/487

See application file for complete search history.

(56) References Cited

U.S. PATENT DOCUMENTS

| | | | |
|---|---|---|---|
| 3,610,729 A | 10/1971 | Rogers | |
| 4,705,356 A | 11/1987 | Berning et al. | |
| 5,103,337 A | 4/1992 | Schrenk et al. | |
| 5,360,659 A | 11/1994 | Arends et al. | |
| 5,486,949 A * | 1/1996 | Schrenk et al. | 359/498 |
| 5,808,798 A * | 9/1998 | Weber et al. | 359/583 |
| 5,828,488 A * | 10/1998 | Ouderkirk et al. | 359/487 |
| 5,882,774 A * | 3/1999 | Jonza et al. | 428/212 |
| 6,045,894 A * | 4/2000 | Jonza et al. | 428/212 |
| 6,368,699 B1 | 4/2002 | Gilbert et al. | |
| 6,498,683 B1 | 12/2002 | Condo et al. | |
| 2004/0125450 A1* | 7/2004 | Hebrink et al. | 359/494 |

FOREIGN PATENT DOCUMENTS

WO    WO 97/01778    1/1997

OTHER PUBLICATIONS

U.S. Appl. No. 10/334,836 entitled "Optical Polarizing Films with Designed Color Shifts," filed Dec. 31, 2002.
U.S. Appl. No. 10/335,458 entiltled "Head-up Display with Polarized Light Source and Wide-angle P-polarization Reflective Polarizer," filed Dec. 31, 2002.
Weber et al., "Giant Birefringent Optics in Multilayer Polymer Mirrors," Science, vol. 287, Mar. 31, 2000, pp. 2451-2456.

* cited by examiner

*Primary Examiner*—Rena Dye
*Assistant Examiner*—Camie S. Thompson
(74) *Attorney, Agent, or Firm*—Milena G. Higgins; Melissa E. Buss

(57) ABSTRACT

A multilayer optical polarizing film has optical layers whose refractive indices substantially match along orthogonal in-plane x- and y-axes, and that mismatch along a z-axis by at least 0.1 and in some cases by at least 0.15. The film has substantially no reflection bands at normal incidence, and for obliquely incident light has at least one reflection band, for p-polarized light only, that monotonically increases and that shifts to shorter wavelengths as the incidence angle increases.

15 Claims, 4 Drawing Sheets

P-POLARIZER WITH LARGE Z-AXIS REFRACTIVE INDEX DIFFERENCE

FIELD OF THE INVENTION

The present invention relates to polarizing optical films. More particularly, the present invention relates to multilayer optical films known as p-polarizers.

BACKGROUND

Multilayer optical film polarizers are known. Such polarizers comprise a plurality of distinct optical layers arranged into optical repeat units across the thickness of the film. In a simple case the optical layers, which number in the tens, hundreds, or thousands, alternate between a first and second light transmissible material in a quarter-wave stack, such that the optical repeat unit consists essentially of two optical layers of equal optical thickness. FIG. 1 shows a perspective view of one such optical repeat unit 10 in the context of a right-handed Cartesian x-y-z coordinate system, where the film extends parallel to the x-y plane, and the z-axis is perpendicular to the film, corresponding to a thickness axis. The optical repeat unit 10 includes adjacent optical layers 12, 14. The refractive indices of the individual layers 12 are denoted:

$n_{1x}, n_{1y}, n_{1z}$ for polarized light whose electric field vector oscillates along the x-, y-, and z-axes respectively. In like fashion, the refractive indices of the individual layers 14 are denoted:

$n_{2x}, n_{2y}, n_{2z}$.

In most multilayer optical film polarizers, the materials and processing conditions are tailored to produce, between adjacent optical layers, a refractive index mismatch along one in-plane axis and a substantial match of refractive indices along an orthogonal in-plane axis. If we denote the magnitude of $n_2-n_1$ along a particular axis as $\Delta n$, these conditions can be expressed as:

$\Delta n_x \approx$ large $\Delta n_y \approx 0$

A film with these properties reflects normally incident light of one polarization and transmits normally incident light of an orthogonal polarization.

Jonza et al. have recently described another type of multilayer polarizing film, coined the "p-polarizer". See e.g. U.S. Pat. No. 5,882,774 (Jonza et al.), "Optical Film". In this construction, the in-plane indices of the two materials are equal, but the z-axis indices differ. In this case, no reflection occurs for s-polarized light at any angle, and the reflectivity for p-polarized light increases monotonically with increasing angle of incidence. This type of article has increasing reflectivity for p-polarized light as angle of incidence increases, and is transparent to s-polarized light.

BRIEF SUMMARY

Applicants have identified particular combinations and classes of materials and processing methods that are particularly advantageous in the fabrication of p-polarizing films. The disclosed films have in-plane refractive index differences of less than 0.02 and even less than 0.01, while also having a large out-of-plane or z-index refractive index difference of at least 0.1, and even 0.15 or more. Such large z-index differences enhance the reflectivity of each optical repeat unit at any given oblique angle of incidence. The greater the reflectivity of each optical repeat unit in the multilayer film, the greater the reflectivity of the film for a fixed number of optical repeat units, and the fewer optical repeat units required in the film for a desired reflectivity level.

In one aspect, then, the specification discloses optical polarizing films that include alternating layers of at least a first and second material, preferably coextrudable thermoplastic polymers. The alternating layers define a coordinate system with mutually orthogonal x- and y-axes extending parallel to the layers and with a z-axis orthogonal to the x- and y-axes. The alternating layers have a refractive index difference along the z-axis of at least 0.1, preferably at least 0.15.

In one aspect, the alternating layers also have a refractive index difference along the x- and y-axes of no more than 0.02, preferably no more than 0.01.

In one aspect, the polarizing film has no reflection bands of reflectivity greater than 20% for normally incident light, preferably no reflection bands of reflectivity greater than 10%.

These and other aspects of disclosed embodiments will be apparent from the detailed description below. In no event, however, should the above summaries be construed as limitations on claimed subject matter, which subject matter is defined solely by the attached claims, as may be amended during prosecution.

BRIEF DESCRIPTION OF THE DRAWINGS

Throughout the specification reference is made to the appended drawings, where like reference numerals designate like elements, and wherein.

DETAILED DESCRIPTION OF THE ILLUSTRATIVE EMBODIMENTS

Figure 1:
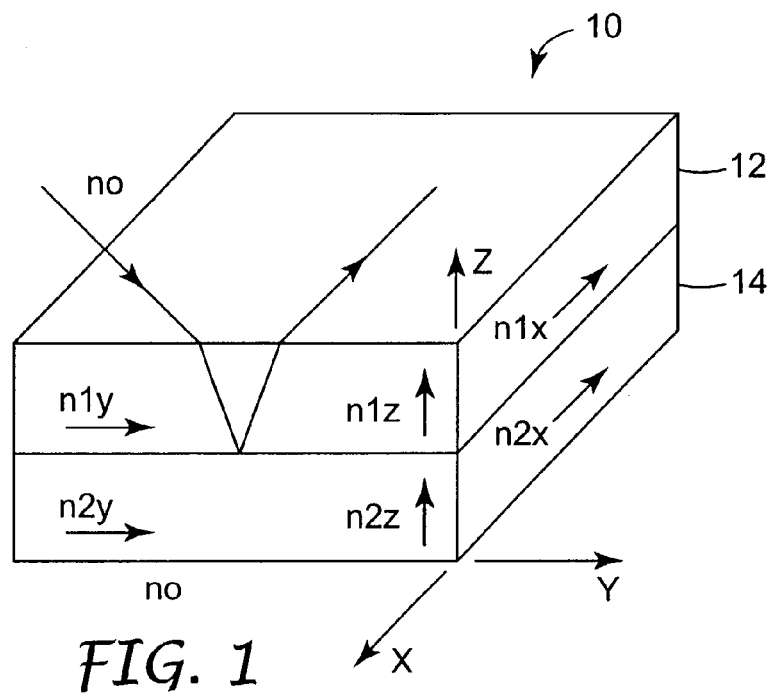
FIG. 1 shows two adjacent optical layers of a multilayer optical film that can include tens, hundreds, or thousands of such layers.

As suggested above, p-polarizing films do not have any substantial reflectivity for normally incident light, whatever its polarization state or wavelength. (In this regard, the reflectivity of the film does not include the reflectivity of the outer surfaces of the film. No substantial reflectivity for purposes of this application means the reflectivity for unpolarized light is no more than 20%, preferably no more than 10% or 5%.) Accordingly, the p-polarizing films do not have any substantial reflection bands for normally incident light. However, for obliquely incident light, the p-polarizing films also reflect p-polarized light in a manner that increases monotonically with increasing angle of incidence, θ. The films do not reflect s-polarized light in any substantial amount (again ignoring any reflectivity attributed to the exposed outer surfaces of the film).

In order to achieve these optical properties, at least one of the optical layers (referred to arbitrarily as A and B, or 1 and 2) within each optical repeat unit is birefringent, such that there is a substantial match of refractive indices of adjacent layers along the in-plane axes, and a substantial mismatch of refractive indices along the thickness axis. If we denote the magnitude of $n_2-n_1$ along a particular axis as Δn, this set of conditions can be expressed as:

$$\Delta n_x \approx 0$$

$$\Delta n_y \approx 0$$

$$\Delta n_z \approx \text{large}$$

The resulting film is referred to as an "off-axis polarizer" or a "p-polarizer". See generally U.S. Pat. No. 5,882,774 (Jonza et al.), "Optical Film". In the relationships shown above, zero for $\Delta n_x$ and for $\Delta n_y$ means the difference is sufficiently small to produce a negligible amount of on-axis (θ=0) reflectivity for either polarization, e.g. less than about 20%, or 10%, or even 5%. This will depend on the total number of optical repeat units employed in the film, with a larger number of optical layers or optical repeat units generally requiring a smaller absolute value of the in-plane index difference to maintain a low reflectivity, and also on the thickness distribution (or "layer density"—the number of layers per range of optical thickness) of the optical repeat units. For a film having a total number of optical layers of a few hundred but less than one thousand, a refractive index difference of up to about 0.02 is typically acceptable, but a difference of 0.01 or less is preferred. "Large" for $\Delta n_z$ means large enough to produce a desired substantial amount of off-axis reflectivity, preferably at least 50% and more desirably at least 80% reflectivity for p-polarized light. These levels are achieved at oblique angles θ (measured in an air medium) of typically 50 to 80 degrees, preferably about 60 degrees. The present application teaches materials and techniques for achieving $\Delta n_z$ of about 0.1, and even 0.15 or greater. The greater the value of $\Delta n_z$, the greater the reflectivity each optical repeat unit in the optical film for p-polarized light at a given oblique angle, and the greater the reflectivity of the film for a fixed number of optical repeat units, or the fewer optical repeat units required in the film for a desired reflectivity level.

A multilayer film with these refractive index relationships exhibits essentially no reflection bands for normally incident light. This is because the electric field vector of such light oscillates only along the in-plane axes, thereby sampling only the in-plane refractive indices. Since those indices are substantially matched from layer-to-layer, the light beam behaves as though traveling through a monolithic material with no internal interfaces. It is only when the light propagates at a substantial angle to the z-axis, and then only where the electric field vector has a component along the z-axis (p-polarized light), that a substantial refractive index difference is experienced by the light at the individual layer interfaces, thus giving rise to reflection by constructive interference.

The teachings of the present application can be applied to p-polarizing films with any desired spectral characteristics. For example, p-polarizing films that produce color shifts in the human-visible spectral region (about 400 to 700 nm) at oblique angles are contemplated. Reference is made to commonly assigned U.S. patent application Ser. No. 10/335,460, filed Dec. 31, 2002. But the teachings can also be applied to p-polarizing films that do not produce color shifts in the human-visible spectral region at oblique angles. For example, p-polarizing films having reflection bands that extend uniformly across the entire visible region for all incidence angles, and ones that have reflection bands only outside the visible region at all incidence angles, are also contemplated.

The reflectivity of a given optical repeat unit exhibits a maximum at a wavelength λ equal to two times the optical thickness of the optical repeat unit, at normal incidence. For purposes of the present application, the optical thickness of an optical repeat unit is considered to be a constant, and equal to the sum of the optical thicknesses of the optical repeat unit's constituent optical layers for normally incident light. Within a multilayer optical film, which may contain tens, hundreds, or thousands of individual optical layers, the optical thicknesses of the optical repeat units can be chosen to all be equal such that a single, relatively narrow reflection band emerges in a desired portion of the spectrum with increasing incidence angle. Alternatively, multiple packets of optical repeat units can be used, where each packet has optical repeat units of a uniform optical thickness, but such optical thickness being different for the different packets so that distinct narrow reflection bands emerge in desired parts of the spectrum. Alternatively or additionally, thickness gradients can be employed to produce broadened reflection bands over portions of the spectrum. Multiple reflection bands can be separated by a sufficient degree to define a spectral region of high transmission (a transmission band) therebetween over a desired wavelength band.

Figure 2:
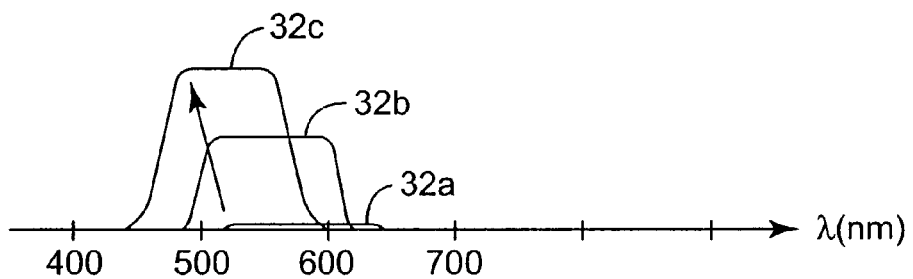
FIG. 2 is a schematic representation depicting the emergence of a reflection band as the incidence angle is increased.

FIG. 2 provides a schematic representation of a reflection band for a p-polarizing film. For normally and near-normally incident light, a curve 32a is provided merely to show that there is essentially no reflection band at all. As explained elsewhere, a slight in-plane mismatch of refractive indices between individual layers may give rise to a barely perceptible reflection band, but the reflectivity of such band is generally less than 20%, more typically less than 10% or 5%. (Reflectivity values given herein assume illumination with unpolarized light unless otherwise noted. The reflectivity of a reflection band is understood herein to be the maximum reflectivity of such band exclusive of any outer surface reflections of the film.) As the observation angle increases, the reflection band appears in the visible region and increases in strength as shown by curve 32b. The reflection band increases still further with increasing observation angle as shown by curve 32c. The peak reflectivity of the reflection band thus increases substantially monotonically with increasing θ, even though slight decreases in peak reflectivity of a few percent may in some circumstances occur with increasing θ at low reflectivity values if the in-plane refractive index mismatch is significant. Although a blue shift can be seen in the sequence of FIG. 2, that figure is most clearly distinguished from conventional reflective polarizing films by the fact that the reflection band essentially emerges from nowhere, rather than simply shifting over to the left. By judicious selection of the layer thicknesses in the optical film, one or more reflection bands can be made to appear anywhere in the visible or near-visible spectrum (including near infrared) at a selected oblique angle in a manner like that shown in FIG. 2, thus allowing the film to shift to any desired transmitted color at a selected oblique angle. Clear-to-green, clear-to-yellow, clear-to-magenta, clear-to-red, and clear-to-blue are examples of color shifts that are possible. A film can be considered clear if, having CIE color coordinates a* and b*, each are no greater than 5, or, more stringently, if the square root of $a^{*2}+b^{*2}$ is no greater than 5. Note that although a great many embodiments exist where the film does not appear cyan over the useable range of entrance angles, in some embodiments the film may well appear cyan at some entrance angles, if it is so designed. If absorbing agents are added to change the baseline on-axis appearance from clear to a particular color, still further transitions are possible such as yellow-to-red or blue-to-green.

Many, but not necessarily all, of the p-polarizing optical films contemplated herein will have at least some optical repeat units whose (normal incidence) optical thickness is equal to half of a wavelength of visible light, or half of a wavelength between about 400 and 700 nm, or from about 200 to 350 nm, while also having a normal angle transmitted appearance that is substantially clear and/or having substantially no reflection bands at normal incidence, whether in the visible or near infrared regions.

As discussed above, each optical repeat unit can consist essentially of just two light transmissible optical layers, such as in a quarter-wave stack design. The reader will appreciate however that other known optical repeat unit designs can also be used in accordance with the instant teachings. For example, four layer designs using three different materials as described in U.S. Pat. No. 5,103,337 (Schrenk et al.), "Infrared Reflective Optical Interference Film", and six layer designs using two materials as described in U.S. Pat. No. 5,360,659 (Arends et al.), "Two Component Infrared Reflecting Film", can also be used. In most instances, however, a simple two-component quarter-wave (0.50 f-ratio) design is preferred since it provides high reflectivity for the lowest order reflection and since higher order reflections are generally of little concern unless reflection bands at about 1200 nm or more are desired and the human-visible appearance of the film is important.

A variety of light transmissible materials can be used for the optical layers making up the optical repeat units of the subject films. Preferably, however, the materials are thermoplastic polymers that can be co-extruded from a multi-layer die and subsequently cast and oriented in sequential or simultaneous stretching operations. Optically thick skin layers can be added for protection and ease of handling, which layers can become protective boundary layers between packets of optical layers within the finished film if one or more layer multipliers is used between the feedblock and the die.

In one approach that has been found advantageous, one light transmissible polymeric material (arbitrarily designated A) remains isotropic throughout the manufacturing process, and another (arbitrarily designated B) becomes birefringent during a stretching procedure in the manufacturing process. The stretching is carried out along both x- and y-axes so that the in-plane refractive indices of the birefringent material end up being about equal to each other, and equal to the refractive index of the isotropic material. The out-of-plane refractive index of the birefringent material then differs substantially from the refractive index of the isotropic material. In a particularly preferred version of this approach, material A has a relatively high (isotropic) refractive index and material B has a somewhat lower isotropic refractive index in the cast film before orientation. During orientation the refractive indices of the B material increase along the two orthogonal stretch directions to match the index of the A material, and the z-axis refractive index of the B material diminishes to widen the gap between it and the index of the A material. Meanwhile, with appropriate materials selection and careful control of the stretch conditions such as film temperature, stretch rate, and stretch ratio, the refractive index of the A material remains constant and isotropic during orientation. Material A has a high refractive index to match the in-plane refractive indices of the oriented material B, and a low enough glass transition temperature $T_g$ to remain isotropic when oriented at conditions necessary to cause birefringence in material B. Preferably, the film is maintained at a temperature of at least about 20° C. above the glass transition temperature of the isotropic material during stretching.

For design flexibility, conventional absorbing agents such as dyes and pigments can be added to one or more layers of the film, or can be applied in one or more coatings such as an adhesive, ink, or hard coat, or incorporated in a separate film or substrate that is subsequently laminated to the subject multilayer optical films, to add a baseline color or tint to the film or article for visual effect. This baseline color would of course be effective at essentially all viewing angles. Additional layers and coatings can also be added to modify optical, mechanical, or chemical properties of the film. See U.S. Pat. No. 6,368,699 (Gilbert et al.), "Multilayer Polymer Film With Additional Coatings or Layers". Conventional multilayer films and polarizers other than p-polarizing films can also be laminated to or otherwise used with the films described herein. Such conventional films may have reflection bands in the visible and/or near infrared regions of the spectrum for aesthetic and/or utilitarian purposes.

Figure 3:
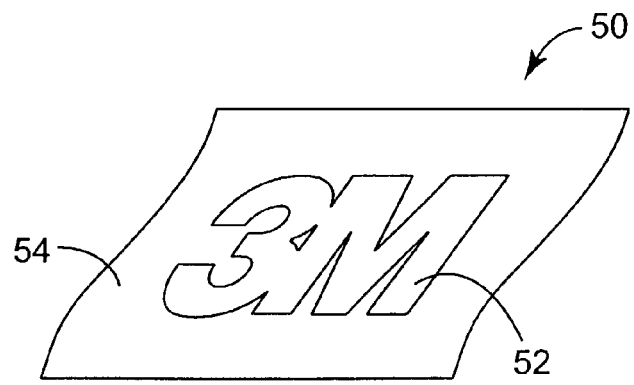
FIG. 3 is a perspective view of a film as described herein that has been embossed or otherwise thinned in a portion thereof.

The unique appearance characteristics of the subject films can be further modified by selectively thinning portions of the film to define a feature, pattern, or indicia. Such selective thinning preferably involves more than simply thinning a skin layer or coating, but rather thinning all the optical layers through the thickness of the film at the localized positions so that the perceived color at oblique angles is changed at those positions. This can be done by localized heating, embossing, or exposure to suitable laser radiation. Preferably the thinning is done after the desired refractive index relationships are established through the orientation process. In that way both the thinned portions and the remaining portions exhibit the desirable refractive index and wavelength properties described above. An example is shown in FIG. 3. There, portion 52 has been thinned in the form of a corporate logo on an optical film 50 that also includes unthinned portion or background 54. In both portions, the in-plane refractive indices of adjacent optical layers are substantially matched, and the out-of-plane refractive indices of such layers are substantially mismatched. When viewed normally along the z-axis, no pattern is discernable since both portions substantially transmit normally incident light. The film 50 can be completely clear, or of a uniform color if absorbing agents are present. At an oblique angle, however, the unthinned portion 54 changes to a first transmitted color and thinned portion 52 changes to a second transmitted color that is blue-shifted relative to the color of portion 54, the amount of blue-shift being proportional to the degree of thinning of the optical layers. Hence, the pattern is difficult to detect at normal viewing but becomes clearly visible at oblique angles. The pattern can incorporate more than two portions, each having a distinct thickness and hence a distinct color at oblique angles, and can also incorporate a gradual thickness change from one portion of the film to the other rather than step changes.

Alternatively, indicia can be added to the films by localized surface roughening or texturing. Such roughening scatters both s- and p-polarized light, and roughened regions stand out from the surrounding optical film. Localized surface texturing can be achieved by a variety of known techniques, such as laser marking, sandblasting, embossing with a matte finish roll, rubbing, and impinging jets.

The teachings of the present application can be applied to p-polarizing films with any desired spectral characteristics. For example, p-polarizing films that produce color shifts in the human-visible spectral region (about 400 to 700 nm) at oblique angles are contemplated. Reference is made to commonly assigned U.S. patent application Ser. No. 10/335,458, filed Dec. 31, 2002. Another end-use application is in computer displays where a broadband reflectivity over the visible region can help recirculate highly oblique light. Still another is the area of authentication systems. The subject films can be permanently affixed to a document, such as a passport, so that an observer can read the document through the film, but can also tell whether the document is authentic by observing the unique color shift at oblique angles, optionally with an analyzing polarizer or with polarized light. The document or other substrate over which the film is applied can include indicia that are colored in such a way that the transmitted color of the film at an oblique angle matches the color of the indicia making them difficult to read, while they are easily read at normal incidence. The films can be sold in the form of a tape or label, which can be adhesively secured to a document or to a package for consumer goods, again for purposes of authentication. An adhesive-preferably a pressure sensitive adhesive but alternatively a hot-melt or a curable adhesive-can be applied to one major surface of the film so that it can be applied to an object. The films can also be sold in the form of a security thread to be incorporated into a security document.

Conventional printed images and/or holographic images can be provided on either major surface of the films, by any suitable technique. Other conventional security features that can be incorporated into the subject films, or any suitable construction of which the film is a part, include microperforations that effectively prevent tampering, heat shrink characteristics that prevent tempering by the application of heat, patterned differential adhesion layers that effectively prevent tempering by delamination, and internal delamination characteristics that provide an indication of tampering. The subject films can also be incorporated into any suitable label, laminate, or card (such as an identification card or transparent or translucent financial transaction card), whether on the surface or in an interior layer of such item.

EXAMPLE

An example film will now be described. The polymer used in the isotropic layers of the film construction was specially formulated to achieve the necessary rheological, chemical, thermal, and optical properties. The polymers used in the film were chosen and/or developed according to the following conditions: they should be coextrudable; they should have adequate interlayer adhesion; and the isotropic polymer should have an unusually high refractive index in order to match the in-plane refractive indices of the birefringent polymer after stretching, and a low enough glass transition temperature so that it remains isotropic when oriented under conditions necessary to cause birefringence in the other polymer material. Preferably, the film is maintained at a temperature of at least about 20° C. above the glass transition temperature of the isotropic material during stretching.

Polymer 1—co-PEN-HNLT

A copolyester was synthesized in a batch reactor with the following raw material charge: 127.3 kg dimethyl naphthalene dicarboxylate, 4.2 kg dimethyl isophthalate, 38.4 kg hexane diol, 50.5 kg ethylene glycol, 8.6 kg 1,3 butyl ethyl propanediol, 1.3 kg trimethylol propane, 34 g zinc acetate, 25 g cobalt acetate, and 75 g antimony triacetate. Under pressure of 0.20 MPa, this mixture was heated to 254° C. while removing methanol. After 34.5 kg of methanol was removed, 56 g of triethyl phosphonoacetate was charged to the reactor and then the pressure was gradually reduced to 133 Pa while heating to 285° C.

The condensation reaction by-product, ethylene glycol, was continuously removed until a polymer with an intrinsic viscosity of 0.84 dL/g, as measured in 60/40 wt. % phenol/o-dichlorobenzene at 86° C., was produced. This material, a thermoplastic polymer, had a glass transition temperature $T_g$ of 76° C. as measured by DSC using ASTM D3418 with a scan rate of 20° C./min, and at a relative humidity of about 50%. The thermal history of the polymer was removed as a factor by performing two DSC heat scans on the sample and recording the $T_g$ of the second heat scan.

Polymer 2—PET

The polyethylene terephthalate used in the example is synthesized in a batch reactor with the following raw material charge: 5,000 kg dimethyl terephthalate, 3,502 kg ethylene glycol, 1.2 kg manganese acetate, and 1.6 kg antimony triacetate. Under pressure of 1520 torr, this mixture is heated to 254° C. while removing the transesterification reaction by-product methanol. After 1,649 kg of methanol is removed, 2.45 kg of triethyl phosphonoacetate is charged to the reactor and then the pressure is gradually reduced to 1 torr while heating to 280° C.

The condensation reaction by-product, ethylene glycol, is continuously removed until a polymer with an intrinsic viscosity of 0.60 dL/g, as measured in 60/40 wt. % phenol/o-dichlorobenzene at 86° C., is produced. This material, a thermoplastic polymer, has a glass transition temperature $T_g$ of 79° C. and a melting temperature $T_m$ of 255° C. as measured by DSC using ASTM D3418 with a scan rate of 20° C./min, and at a relative humidity of about 50%. The thermal history of the polymer is removed as a factor by performing two DSC heat scans on the sample and recording the $T_g$ of the second heat scan.

Polymer 3—PETG

This copolyester was obtained commercially from Eastman Chemical Company, Kingsport, Tenn., under product code Eastar brand PETG 6763. It exhibits a glass transition temperature $T_g$ of 83° C.

Polymer 4—70/30 Polyester Blend

This is a blend of 70 wt % PET and 30 wt % PETG. It exhibits a glass transition temperature $T_g$ of about 81° C.

Film Example

A multilayer optical polarizing film was made using Polymer 1 as one of the light transmissible materials, and Polymer 4 (the blend of 70 wt % PET and 30 wt % PETG) for the other material. These materials were coextruded through a multi-layer melt manifold to create a stack of 275 alternating layers of Polymer 1 and Polymer 4. An additional set of thick external protective skin layers made from Polymer 4 were coextruded on either side of the 275 layer stack to form a cast web with 277 total layers and a total thickness of 0.021 inches (0.53 mm). In this cast web, all layers were isotropic in refractive index, with Polymer 1 having an index of about 1.618 and Polymer 4 having an index of about 1.567 at visible wavelengths. A piece of this cast web was then heated by impingement with hot air at 100° C. for 45 seconds and then oriented simultaneously in two orthogonal in-plane directions at a draw rate of 100%/sec to a final draw ratio of 3.6×3.6. The resulting optical film had a thickness of about 0.0016 inches (0.041 mm) and a useable area of about 10 by 10 inches (about 650 cm$^2$). The refractive indices of the outer skin layers composed of Polymer 4 were measured with a Metricon prism coupler refractometer at 632.8 nm on the finished film and found to be:

Polymer 4: $n_x=n_y=1.635; n_z=1.51$

The refractive index of the other polymer was measured previously in a crushed pellet form with the same refractometer and found to be 1.618. By analyzing the optical properties of the finished (stretched) film, and knowing the final refractive indices of Polymer 4, it was determined that this other polymer had remained substantially isotropic, i.e., that it had the following refractive indices in the finished film:

Polymer 1: $n_x=n_y=n_z=1.618$

Figure 4:
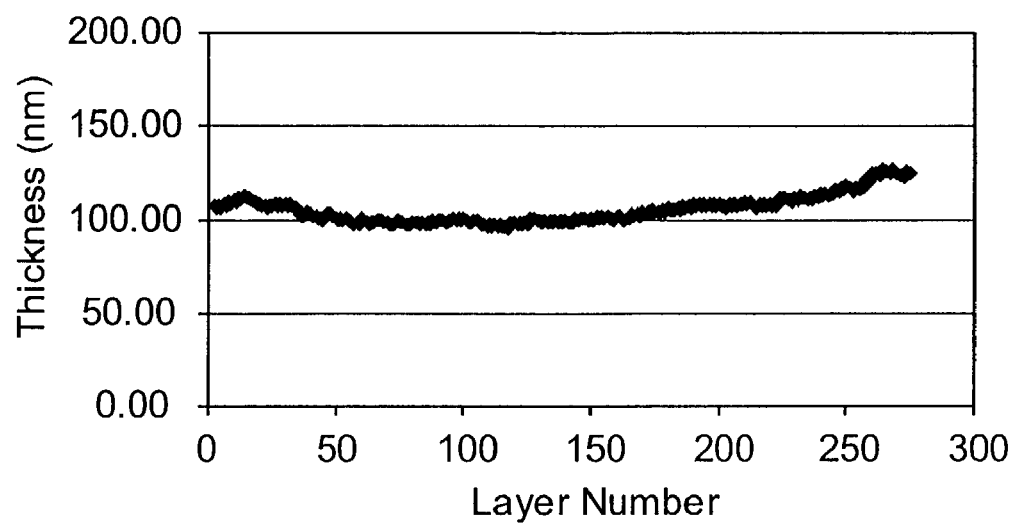
FIG. 4 is a plot of physical thickness of all 275 optical layers in an example film described below.

Hence, for this film, $\Delta n_x = \Delta n_y \approx 0.017$ $\Delta n_z \approx 0.108$ The relative thickness profile of the optical repeat units in the finished film was measured with an atomic force microscope (AFM). These relative measurements were then combined with a global scaling factor and an f-ratio factor selected for best agreement with the observed optical properties of the film, and the resulting physical thickness profile of the 275 optical layers in the film is shown in FIG. 4. Note that adjacent layers have approximately the same physical thickness, and hence in this case also approximately the same on-axis optical thickness (f-ratio≈0.50). Also, multiple distinct nonzero layer thickness gradients can be detected over various segments of the film thickness. The individual optical layers range in physical thickness from just under about 100 nm to about 125 nm. With the refractive index properties of the two materials as noted above, these thicknesses yield optical repeat units whose optical thicknesses range from just under 325 nm to about 405 nm. Doubling these values correspond to optical wavelengths of just under 650 nm to about 810 nm.

Figure 5A:
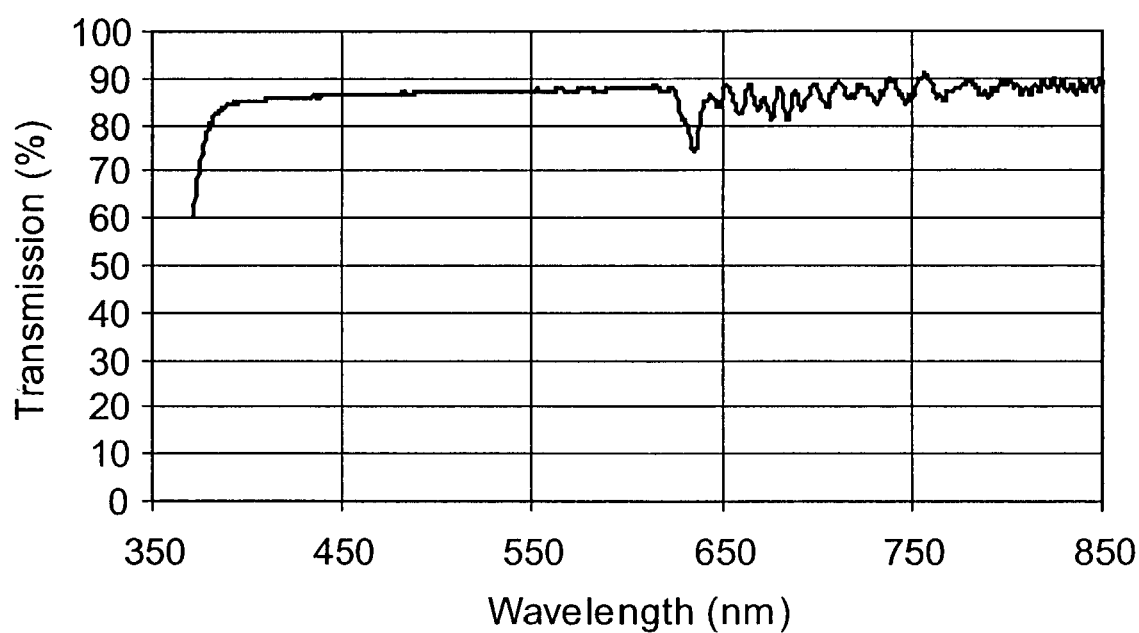
FIGS. 5a and 5b show the measured transmission of an example film in air at normal incidence and 60°, respectively.
Figure 5B:
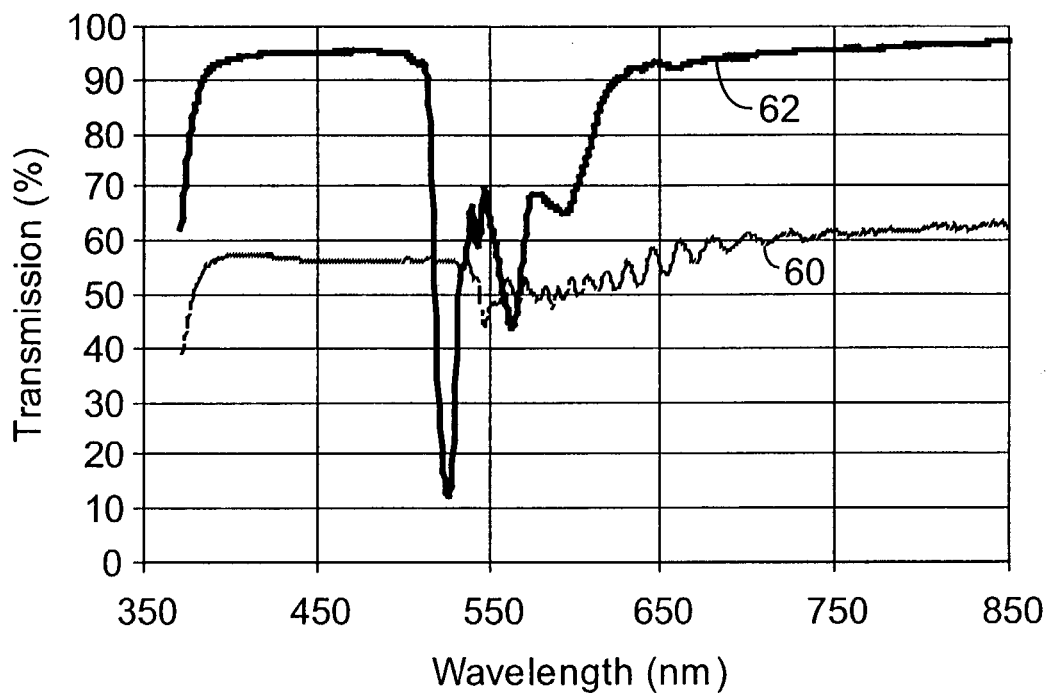

Despite the fact that some of the optical repeat units had optical thicknesses corresponding to half of a visible wavelength of light, the film was substantially clear when viewed at a normal angle (observation angle θ=0). When viewed at an observation angle of 60°, the film had a magenta transmitted appearance. This color was insensitive to rotations of the film about an axis normal to the film. Further, the color could be made to be more saturated or could be made to substantially disappear using an analyzer in front of the observer's eye, the analyzer being rotated to transmit p-polarized light and s-polarized light respectively. Also, the film did not become cyan at any point between θ=0 and 60°. The percent transmission of the film in air was measured and is shown in FIGS. 5a and 5b for normally incident light and light incident at 60°, respectively. In FIG. 5b, curve 60 is the transmission of s-polarized light only, and curve 62 is for p-polarized light only. The FIGS. 5a–b graphs include no corrections or offsets for the broadband surface reflections at the front and rear film-air interfaces. Note the absence of any substantial reflection bands at normal incidence. Note also the presence of a significant reflection band for p-polarized light in the visible region at 60° incidence. The approximately 50% broadband reflectivity of s-polarized light in FIG. 5b is due to the film-air surface reflections.

Additional Polymers and Film Embodiments

Additional polymers have been developed and/or identified that satisfy the conditions mentioned above: that they should be coextrudable; that they should have adequate interlayer adhesion; and that the isotropic polymer should have an unusually high refractive index in order to match the in-plane refractive indices of the birefringent polymer after stretching, and a low enough glass transition temperature so that it remains isotropic when oriented under conditions necessary to cause birefringence in the other polymer material. Further, the polymer used as the isotropic layer desirably has a refractive index of at least about 1.61, more desirably about at least 1.65, so that polymers that exhibit greater birefringence (e.g., pure PET) can be used to help increase the z-index differential between optical layers to achieve higher reflectivity.

Polymer 5—co-PEN-5545HD

A copolyester was synthesized in a batch reactor with the following raw material charge: 87.6 kg dimethyl naphthalene dicarboxylate, 57 kg dimethyl terephthalate, 12.3 kg hexane diol, 81.6 kg ethylene glycol, 0.7 kg trimethylol propane, 34 g zinc acetate, 25 g cobalt acetate, and 55 g antimony triacetate. Under pressure of 0.20 MPa, this mixture was heated to 254° C. while removing methanol. After 41.5 kg of methanol was removed, 56 g of triethyl phosphonoacetate was charged to the reactor and then the pressure was gradually reduced to 133 Pa while heating to 285° C.

The condensation reaction by-product, ethylene glycol, was continuously removed until a polymer with an intrinsic viscosity of 0.53 dL/g, as measured in 60/40 wt. % phenol/o-dichlorobenzene at 86° C., was produced. This material, a thermoplastic polymer, had a glass transition temperature $T_g$ of 92° C. as measured by DSC using ASTM D3418 with a scan rate of 20° C./min, and at a relative humidity of about 50%. The thermal history of the polymer was removed as a factor by performing two DSC heat scans on the sample and recording the $T_g$ of the second heat scan.

The polymer is suitable for use in the isotropic optical layers of a multilayer film, and has a refractive index of 1.612.

Polymer 6—co-PEN Containing Nano-Titania

The isotropic refractive index of coPEN-HNLT described as Polymer 1 can be increased to 1.65 by incorporation of about 30 wt % titania particles with average particle size of less than about 30 nm. Titania itself has a refractive index of about 2.4 in the visible. The nano-titania particles should be adequately dispersed to avoid excessive haze or scattering of light in the polymer matrix.

The resulting thermoplastic polymer-based material has the same glass transition temperature as Polymer 1, i.e., about 76° C., and is suitable for use in the isotropic optical layers of a multilayer film.

Polymer 7—co-PEN Containing Nano-Zirconia

The isotropic refractive index of coPEN-HNLT described as Polymer 1 can be increased to 1.65 by incorporation of about 40 wt % zirconia particles with average particle size of less than about 30 nm. Zirconia itself has a refractive index of about 2.2 in the visible. The nano-zirconia particles should be adequately dispersed to avoid excessive haze or scattering of light in the polymer matrix.

The resulting thermoplastic polymer-based material has the same glass transition temperature as Polymer 1, i.e., about 76° C., and is suitable for use in the isotropic optical layers of a multilayer film.

Polymer 8—High Index Acrylate Containing Nano-Titania

Copolymers of naphthyl thio-acrylate and naphtyl thioethyl acrylate and/or naphthyl oxyethyl acrylate can be synthesized with 30 wt % titania particles to produce a polymer-based material having an isotropic refractive index of approximately 1.65. The titania particles, which should have an average size of less than about 30 nm, should be adequately dispersed to avoid excessive haze or scattering of light in the acrylate polymer matrix.

The glass transition temperature of this polymer-based material can be tailored by adjusting the relative proportions of the acrylate monomers, since $T_g \approx 100°$ C. for naphthyl thio-acrylate, $T_g \approx 40°$ C. for naphtyl thioethyl acrylate, and $T_g \approx 9°$ C. for naphthyl oxyethyl acrylate. In particular, the glass transition temperature of the material can be tailored to be below 79° C., the glass transition temperature of PET. This Polymer 8 is suitable for use in the isotropic optical layers of a multilayer film.

Polymer 9—High Index Acrylate Containing Nano-Zirconia

Copolymers of naphthyl thio-acrylate and naphtyl thioethyl acrylate and/or naphthyl oxyethyl acrylate can be synthesized with 40 wt % zirconia particles to produce a polymer-based material having an isotropic refractive index of approximately 1.65. The zirconia particles, which should have an average size of less than about 30 nm, should be adequately dispersed to avoid excessive haze or scattering of light in the acrylate polymer matrix.

The glass transition temperature of this thermoplastic polymer-based material can be tailored by adjusting the relative proportions of the acrylate monomers, as described above in connection with Polymer 8, and can be tailored to be below 79° C. This Polymer 9 is suitable for use in the isotropic optical layers of a multilayer film.

Polymer 10—High Index Isotropic co-PEN

A copolyester can be synthesized in a batch reactor with the following raw material charge: 127.3 kg 2,6-dimethyl naphthalene dicarboxylate, 8.4 kg 2,3-dimethyl naphthalene dicarboxylate, 48.4 kg hexane diol, 50.5 kg ethylene glycol, 8.6 kg 1,3 butyl ethyl propanediol, 1.3 kg trimethylol propane, 34 g zinc acetate, 25 g cobalt acetate, and 75 g antimony triacetate. Under pressure of 0.20 MPa, this mixture can then be heated to 254° C. while removing methanol. After 32.5 kg of methanol is removed, 56 g of triethyl phosphonoacetate can be charged to the reactor and then the pressure gradually reduced to 133 Pa while heating to 285° C.

The condensation reaction by-product, ethylene glycol, can be continuously removed until a polymer with an intrinsic viscosity of at least 0.6 dL/g, as measured in 60/40 wt. % phenol/o-dichlorobenzene at 86° C., is produced. This material, a thermoplastic polymer, has a glass transition temperature $T_g$ of approximately 76° C. as measured by DSC using ASTM D3418 with a scan rate of 20° C./min, and at a relative humidity of about 50%.

The thermoplastic polymer is suitable for use in the isotropic optical layers of a multilayer film, and has a refractive index of 1.63.

Polymer 11—co-PHT

A copolyester was synthesized in a batch reactor with the following raw material charge: 100 kg dimethyl terephthalate, 93 kg 1,6-hexane diol, 3.1 kg triethylene glycol, 0.9 kg trimethylol propane, 50 g tetra butly titanate, 30 g cobalt acetate, and 35 g antimony triacetate. Under pressure of 0.20 MPa, this mixture was heated to 254° C. while removing methanol. After 33 kg of methanol was removed, 35 g of triethyl phosphonoacetate was charged to the reactor and then the pressure was gradually reduced to 133 Pa while heating to 270° C.

The condensation reaction by-product, 1,6 hexane diol, was continuously removed until a polymer with an intrinsic viscosity of 0.86 dL/g, as measured in 60/40 wt. % phenol/o-dichlorobenzene at 86° C., was produced. This material, a thermoplastic polymer, had a glass transition temperature $T_g$ of 15° C. and a melting temperature $T_m$ of 142° C. as measured by DSC using ASTM D3418 with a scan rate of 20° C./min, and at a relative humidity of about 50%. The thermal history of the polymer was removed as a factor by performing two DSC heat scans on the sample and recording the $T_g$ of the second heat scan.

The polymer is suitable for use in the birefringent optical layers of a multilayer film, and has a pre-stretch refractive index of about 1.55. Under suitable biaxial stretching conditions, the in-plane refractive indices can increase to about 1.59 to 1.61 and the out-of-plane refractive index can diminish to about 1.51.

Polymer 12—80/20 Polyester Blend

This is a blend of 80 wt % PET and 20 wt % PETG. It has a glass transition temperature $T_g$ of about 82° C.

The polymer is suitable for use in the birefringent optical layers of a multilayer film, and has a pre-stretch refractive index of about 1.568. Under suitable biaxial stretching conditions, the in-plane refractive indices can increase to about 1.638 and the out-of-plane refractive index can diminish to about 1.506.

Polymer 13—CoPVN Isotropic Copolymer

Copolymers of vinyl naphthalene and phenoxy ethyl acrylate or other low $T_g$ acrylates such as ethyl acrylate, butyl acrylate, and iso-octyl acrylate can be synthesized to provide a refractive index of 1.65 and a glass transition temperature of less than 79° C. Optionally, butadiene or other low $T_g$ rubber comonomers can be copolymerized with vinyl naphthalate to provide a refractive index of 1.65 and a glass transition temperature of less than 79° C.

Polymer 14—Atactic PVN

Atactic polyvinyl naphthalene has an isotropic refractive index of 1.68 and thus can be useful for increasing the index difference along the z-axis for increased reflectivity. The Tg of this material is 151° C., and hence it would be suitable for coextrusion and orientation with a higher $T_g$ CoPEN as the birefringent material designed to have in-plane refractive indices of 1.68–1.70 after orientation.

Polymer 15—High $T_g$ CoPEN Birefringent Polymer

Copolymers of PEN (polyethylene naphthalate) can be synthesized utilizing 2,6 dimethyl naphthalate and 2,3 dimethyl naphthalate or 4,4 biphenyl dicarboxylate as comonomers to dilute the in-plane refractive indices of PEN down to 1.68–1.7 so as to match those of atactic PVN as the istotropic material.

Further Film Embodiments

A multilayer optical polarizing film can be made using Polymer 5 as the isotropic light transmissible material, and Polymer 11 (the co-PHT) as the birefringent light transmissible material. These materials can be coextruded through a multi-layer melt manifold to create a stack of 275 (or other suitable number of) alternating layers of Polymer 5 and Polymer 11. An additional set of thick external protective skin layers made from Polymer 11 can be coextruded on either side of the 275 layer stack to form a cast web with 277 total layers and a total thickness of, say, about 0.019 inches (0.48 mm) or other suitable value. In this cast web, all layers are isotropic in refractive index, with Polymer 5 having an index of about 1.612 and Polymer 11 having an index of about 1.55 at visible wavelengths. This cast web can then be heated to a suitable temperature, such as 115° C., by impingement with hot air or other conventional heating means and oriented simultaneously in two orthogonal in-plane directions at a suitable draw rate, such as 1000%/sec, to a final draw ratio such as 3.0×3.0. The resulting optical film can have a thickness of about 0.002 inches (0.05 mm). The skin and optical layers composed of Polymer 11 can achieve the following refractive indices in the finished film:

Polymer 11: $n_x = n_y = 1.61$; $n_z = 1.51$

The refractive index of the other polymer can remain isotropic by appropriate selection of the stretch conditions, with an isotropic refractive index of 1.612:

Polymer 5: $n_x = n_y = n_z = 1.612$

Hence, for such a film, $\Delta n_x = \Delta n_y \approx 0.002$ $\Delta n_z \approx 0.102$ The thickness profile of the optical layers in the finished film can be any suitable function that achieves the desired transmitted color at an oblique angle, whether uniform, step, linear, or other known function.

Note that the in-plane refractive index difference is well below 0.01, yielding a film that is substantially clear when viewed at 0° observation angle even if each and every optical repeat unit in the film has an optical thickness of half of a visible wavelength.

In another embodiment, a multilayer optical polarizing film can be made using Polymer 1 as the isotropic light transmissible material, and Polymer 12 (the blend of 80 wt % PET and 20 wt % PETG) as the birefringent material. These materials can be coextruded through a multi-layer melt manifold to create a stack of 223 (or other suitable number of) alternating layers of Polymer 1 and Polymer 12. The stack need not have any layer thickness gradient, but preferably does have a gradient corresponding to a full-width at half-maximum (FWHM) bandwidth of the reflection band in the finished film of about 100 nm. This stack can be provided to an asymmetric multiplier where the extrudate is split into unequal widths of a suitable ratio, such as about 1:1.44, and stacked after equalizing the widths to provide two optical packets and a total of 445 optical layers. An additional set of thick external protective skin layers made from Polymer 12 can be coextruded on either side of the 445 layers to form a cast web with 447 total layers and a total thickness of 0.020 inches (0.51 mm). In this cast web, all layers are isotropic in refractive index, with Polymer 1 having an index of about 1.618 and Polymer 12 having an index of about 1.568 at visible wavelengths. This cast web can then be heated by impingement with hot air at 102° C. and then oriented in two orthogonal in-plane directions at a suitable draw rate to a final draw ratio of about 3.5×3.5. The skin and optical layers composed of Polymer 12 can achieve the following refractive indices in the finished film:

Polymer 12: $n_x = n_y = 1638$; $n_z = 1.506$

The refractive index of the other polymer can remain isotropic by appropriate selection of the stretch conditions, with an isotropic refractive index of 1.618:

Polymer 1: $n_x = n_y = n_z = 1.618$

Figure 6:
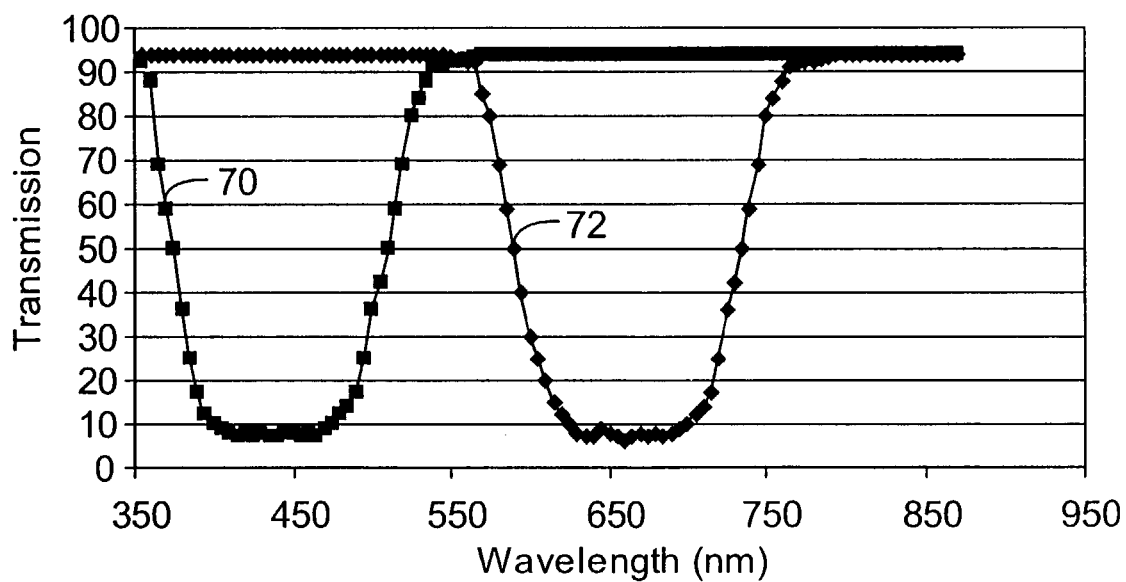
FIG. 6 shows a calculated transmission spectrum for p-polarized light at about 60° incidence of two optical layer packets that can be used in a single optical film to yield a green transmitted color at such angle.

Hence, for such a film, $\Delta n_x = \Delta n_y \approx 0.02$ $\Delta n_z \approx 0.112$ The resulting optical film can provide, for obliquely-incident light, two distinct p-polarization reflection bands corresponding to the two 223 layer packets in the film. With suitable control of the layer thickness profile of each packet and of the width ratio for the asymmetric multiplier, the reflection bands can be separated sufficiently to define a gap therebetween characterized by low reflectivity and high transmission. In this way a film that shifts in transmitted appearance from clear at normal incidence to green at about 60° can be provided. Computed transmission spectra at 60° incidence and for p-polarized light only are shown in FIG. 6, where the curves 70, 72 are the computed transmission of the two individual packets that make up the film. As demonstrated, each packet produces a strong reflection band at the oblique angle. The mathematical product of these two curves yields the computed transmission of the film when illuminated with p-polarized light at 60°. Of course, a clear-to-green multilayer film as just described can also be made with other polymer combinations taught herein, so long as the optical layer distribution is tailored to provide the separated reflection bands at 60°.

Figure 7:
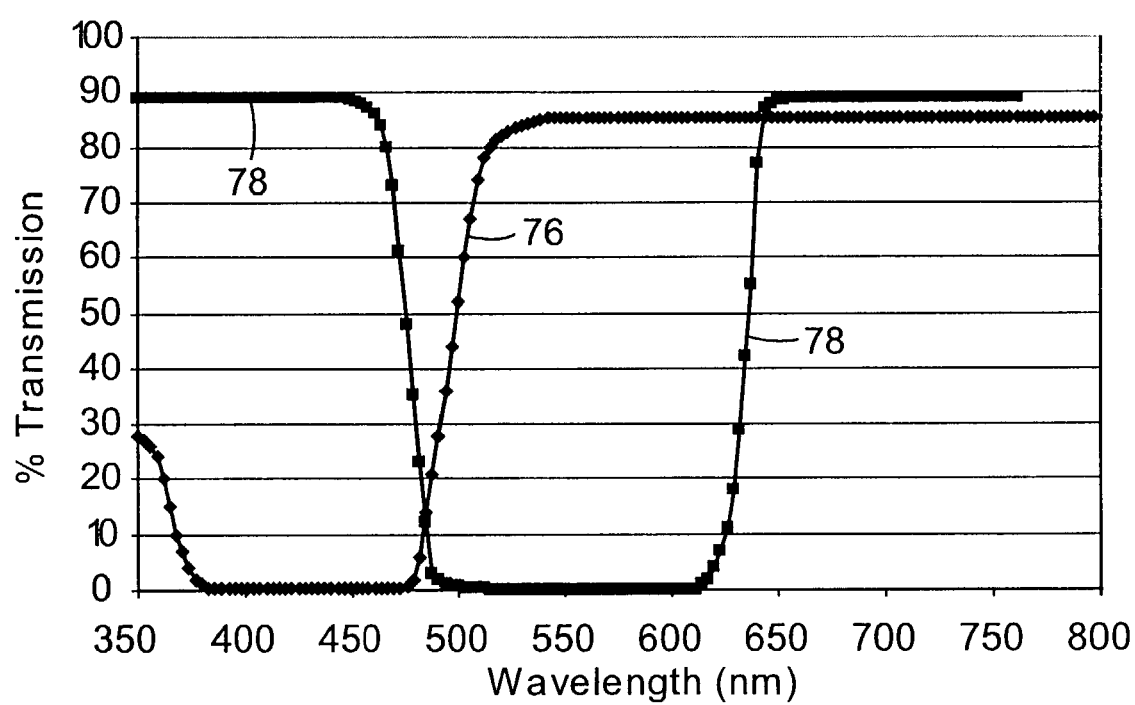
FIG. 7 shows a calculated transmission spectrum for p-polarized light at about 60° incidence of a dyed optical film.

In yet another embodiment, a multilayer optical interference film can be made in the same way as the Example Film, except the layer thickness can be controlled to provide a substantially linear layer thickness gradient across the thickness of the film between limits that provide a single reflection band extending from about 500 nm to about 600 nm for p-polarized light at 60°. Also, a yellow dye (absorbing from about 400 to 500 nm) is incorporated into the film (or in a separate film or coating laminated or otherwise applied to the multilayer film) in an amount sufficient to provide a yellow baseline color to the film at normal viewing. FIG. 7 exemplifies the absorption of the yellow dye with curve 76, which curve is relatively insensitive to changes in viewing or incidence angle θ. On the other hand, curve 78 exemplifies the transmission of the optical layer stack for p-polarized light at θ=60°. Curve 78, of course, changes greatly with viewing angle, becoming a flat line at the upper end of the percent transmission scale for normally incident light. Such a combination of absorbing dye and color shifting p-polarizing film produces a film that changes from yellow at θ=0° to red at θ=60°.

Many variations of the foregoing yellow-to-red film are contemplated, by changing the absorbing agent and/or the optical stack design (and thus the reflection band position, width, number, and/or strength). In one such variation, the yellow dye is replaced with a blue dye that absorbs from about 600 to 700 nm. Also, the 500–600 nm reflection band is replaced with band that extends from about 400 to 500 nm for p-polarized light at 60° by an appropriate change in optical layer thickness. The result is a film that changes from blue at θ=0° to green at θ=60°.

Other material pairs of interest for the p-polarizing multilayer optical film are combinations in which the birefringent light transmissible material is Polymer 2 (PET), and the isotropic light transmissible material is selected from the group of Polymer 6 (co-PEN with nano-titania), Polymer 7 (co-PEN with nano-zirconia), Polymer 8 (acrylate with nano-titania), and Polymer 9 (acrylate with nano-zirconia). These material combinations can be coextruded and oriented under suitable conditions analogous to those of the Example to provide a finished multilayer p-polarizing film whose layers have the following refractive indices:

Isotropic material: $n_x \approx n_y \approx n_z \approx 1.65$

Birefringent material (Polymer 2): $n_x \approx n_y \approx 1.65$; $n_z \approx 1.49$ And thus, $\Delta n_x \approx \Delta n_y \approx 0$ $\Delta n_z \approx 0.16$ The relatively large z-index difference—greater than 0.15—provides substantially higher reflectivity for off-axis p-polarized light. At the same time, a good in-plane index match ensures substantially no reflection bands at normal incidence.

Another material pair of interest for the p-polarizing multilayer optical film is a combination in which the birefringent light transmissible material is Polymer 12 (80% PET/20% PETG) and the isotropic light transmissible material is Polymer 10 (High Index co-PEN). These materials can be coextruded and oriented under suitable conditions analogous to those of the Example to provide a finished multilayer p-polarizing film whose layers have the following refractive indices:

Polymer 10: $n_x \approx n_y \approx n_z \approx 1.63$

Polymer 2: $n_x \approx n_y \approx 1.64$; $n_z \approx 1.50$

And thus, $\Delta n_x = \Delta n_y \approx 0.01$ $\Delta n_z \approx 0.13$

In other embodiments, sPS (syndiotactic polystyrene) or sPN (syndiotactic polynaphthalene) can be utilized as the birefringent materials. Since these polymers are characterized in that refractive indices along the stretch directions (x- and y-axes) decrease and the refractive index along the z-axis increases upon orientation, the isotropic polymer should be chosen such that its refractive indices are lower than that of either sPS or sPN. For example, the refractive indices of sPS are 1.585 before orientation and after stretching the in-plane refractive indices decrease to 1.56 and the z-axis refractive index increases to 1.65. Since the $T_g$ of sPS is approximately 105° C., a copolymer such as PETG can be used as the isotropic polymer to give the following sets of refractive indices after orientation:

PETG: $n_x \approx n_y \approx n_z \approx 1.56$ sPS: $n_x \approx n_y \approx 1.56$; $n_z \approx 1.65$ $\Delta n_x \approx \Delta n_y \approx 0.0$ $\Delta n_z \approx 0.09$ Glossary of Certain Terms F-ratio: the relative contribution of a given individual layer to the total optical thickness of a given ORU. The f-ratio for the k-th individual layer is:

$$f_k = \frac{n_k \cdot d_k}{\sum_{m=1}^{N} n_m \cdot d_m},$$

where $1 \leq k \leq N$, where N is the number of constituent layers in the ORU, where $n_k$ ($n_m$) is the relevant refractive index of k-th (m-th) layer, and $d_k$ ($d_m$) is the physical thickness of layer k (m).

Optical Repeat Unit ("ORU"): a stack of at least two individual layers which repeats across the thickness of a multilayer optical film, though corresponding repeating layers need not have the same thickness.

Optical thickness: the physical thickness of a given body times its refractive index.

In general, this is a function of wavelength and polarization.

Reflection band: a spectral region of relatively high reflectance bounded on either side by regions of relatively low reflectance.

All patents and patent applications referenced herein are incorporated by reference in their entirety. Various modifications and alterations of this invention will be apparent to those skilled in the art without departing from the scope and spirit of this invention, and it should be understood that this invention is not limited to the illustrative embodiments set forth herein.

What is claimed is:

1. A polarizing film, comprising alternating layers of at least a first and second material, the alternating layers defining a coordinate system with mutually orthogonal x- and y-axes extending parallel to the layers and with a z-axis orthogonal to the x- and y-axes, the alternating layers having a refractive index difference along the x- and y-axes of no more than 0.02, the alternating layers also having a refractive index difference along the z-axis of at least 0.1, wherein a repeat unit in the film comprising a first alternating layer of the first material and a second alternating layer of the second material has a sum of an optical thickness of the first alternating layer and an optical thickness of the second alternating layer of 200 nm to 350 nm.

2. The film of claim 1, wherein the alternating layers have a refractive index difference along the x- and y-axis of no more than 0.01.

3. The polarizing film of claim 1, wherein the polarizing film has no reflection band of reflectivity greater than 20% for normally incident light.

4. The film of claim 3, wherein the polarizing film has no reflection bands of reflectivity greater than 10% for normally incident light.

5. The film of claims 1 or 3, wherein the alternating layers have a refractive index difference along the z-axis of at least 0.15.

6. The film of claims 1 or 3, wherein the first material is substantially isotropic in refractive index and the second material is birefringent.

7. The film of claim 6, wherein the second material has a refractive index along the z-axis that is less than a refractive index of the second material along the x- and y-axes.

8. The film of claim 6, wherein the first material has an isotropic refractive index of at least 1.61.

9. The film of claim 8, wherein the first material has an isotropic refractive index of at least 1.65.

10. The film of claim 6, wherein the first and second materials comprise coextrudable thermoplastic polymers.

11. The film of claim 1 or 3, wherein the film has a first and second portion, and the plurality of layers in the first portion have a different overall thickness than the plurality of layers in the second portion.

12. The film of claim 11, wherein the first and second portions define indicia.

13. A polarizing film comprising at least one repeat unit, wherein the repeat unit comprises a first alternating layer of at least a first material and a second alternating layer of at least a second material, wherein the alternating layers define a coordinate system with mutually orthogonal x- and y- axes extending parallel to the layers and a z-axis orthogonal to the x- and y-axes, the alternating layers having:

(1) a refractive index difference along the z-axis of 0.1 or greater, (2) a refractive index difference along the x-axis of up to 0.02, and (3) a refractive index difference along the y-axis of up to 0.02; and wherein a repeat unit in the film has a sum of an optical thickness of the first alternating layer and an optical thickness of the second alternating layer of 200 nm to 350 nm.

14. The polarizing film of claim 13, wherein one of the first material and the second material further comprises a particle selected from the group consisting of titania and zircoma.

15. The polarizing film of claim 14, wherein the particles have an average particle size of less than 30 nm.

* * * * *

UNITED STATES PATENT AND TRADEMARK OFFICE
CERTIFICATE OF CORRECTION

PATENT NO.        : 7,094,461 B2
APPLICATION NO.   : 10/334836
DATED             : August 22, 2006
INVENTOR(S)       : Andrew T. Ruff It is certified that error appears in the above-identified patent and that said Letters Patent is hereby corrected as shown below:

First Page, Col. 2 (Other Publications)
Line 3, Delete "entiltled" and insert -- entitled --, therefor.

Column 7,
Lines 11-15, Delete the first two sentences of the paragraph and replace them with -- Films as described herein and articles incorporating such films can be used in a variety of end-use applications. For example, specialized optical systems can benefit from the unique properties of a p-polarizer. --.
Line 15, Delete "Reference is made to" and insert -- See, for example, -- , therefor.
Line 16, Delete "patent".

Column 9,
Line 40, Delete "$\Delta n_y\_0.017$" and insert -- $\Delta n_y \approx 0.017$ --, therefor.

Column 12,
Line 32 (approx.), After "tetra" delete "butly" and insert -- butyl --, therefor.

Column 13,
Line 16, Delete "Tg" and insert -- $T_g$ --, therefor.
Line 30 (approx.), Delete "istotropic" and insert -- isotropic --, therefor.
Line 65, Delete "$\Delta n_y\_0.002$" and insert -- $\Delta n_y \approx 0.002$ --, therefor.

Column 18,
Line 33 (approx.), In Claim 14, delete "zircoma." And insert -- zirconia. --, therefor.

Signed and Sealed this

Third Day of July, 2007

JON W. DUDAS
*Director of the United States Patent and Trademark Office*